United States Patent
Fritsch et al.

(10) Patent No.: US 11,667,286 B2
(45) Date of Patent: Jun. 6, 2023

(54) DEVICE AND METHOD FOR DETERMINING A TACHOMETER CHARACTERISTIC CURVE OF A VEHICLE, SYSTEM FOR CONTROLLING THE SPEED OF A VEHICLE AND VEHICLE

(71) Applicant: Bayerische Motoren Werke Aktiengesellschaft, Munich (DE)

(72) Inventors: Oliver Fritsch, Munich (DE); Christian Rathgeber, Munich (DE); Franz Winkler, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/791,747

(22) Filed: Feb. 14, 2020

(65) Prior Publication Data

US 2020/0180621 A1 Jun. 11, 2020

Related U.S. Application Data

(63) Continuation of application No. PCT/EP2018/074528, filed on Sep. 12, 2018.

(30) Foreign Application Priority Data

Oct. 6, 2017 (DE) .................. 10 2017 217 804.3

(51) Int. Cl.
*B60W 30/14* (2006.01)
*B60W 40/105* (2012.01)

(52) U.S. Cl.
CPC ........ *B60W 30/143* (2013.01); *B60W 40/105* (2013.01)

(58) Field of Classification Search
CPC .. B60W 30/14; B60W 30/143; B60W 30/146; B60W 40/10; B60W 40/105;
(Continued)

(56) References Cited

U.S. PATENT DOCUMENTS 3,626,247 A * 12/1971 Morse ................ G01P 3/44
361/239
5,020,008 A    5/1991 Chambers et al.
(Continued)

FOREIGN PATENT DOCUMENTS

CN    101542297 A    9/2009
CN    104487276 A    4/2015
(Continued)

OTHER PUBLICATIONS

International Search Report (PCT/ISA/210) issued in PCT Application No. PCT/EP2018/074528 dated Dec. 10, 2018 with English translation (five pages).
(Continued)

*Primary Examiner* — Russell Frejd
*Assistant Examiner* — Sara J Lewandroski
(74) *Attorney, Agent, or Firm* — Crowell & Moring LLP

(57) ABSTRACT

A device for determining a tachometer characteristic curve of a motor vehicle includes a detection apparatus and a determining apparatus. The determining apparatus is configured to form a tachometer characteristic curve on the basis of one or more mean value pairs, which are formed by means of one locomotion signal mean value and one speed mean value, by means of which tachometer characteristic curve locomotion signals and speed values are converted into one another, and/or to change a tachometer characteristic curve which is already present.

9 Claims, 2 Drawing Sheets

(58) Field of Classification Search
CPC ............ B60W 40/107; B60W 40/109; B60W 2050/0019; B60W 2050/0026; B60W 2050/0028; B60W 2050/0031; B60W 2050/0037; B60T 2270/311; B60T 2270/313; B60T 2250/04; B60T 2250/042
See application file for complete search history.

(56) References Cited

U.S. PATENT DOCUMENTS

| | | | | |
|---|---|---|---|---|
| 5,137,104 | A * | 8/1992 | Etoh | B60K 31/047 180/179 |
| 5,373,446 | A * | 12/1994 | Mizukoshi | B60T 8/171 702/148 |
| 5,987,378 | A * | 11/1999 | Schipper | G01C 21/26 701/408 |
| 6,446,018 | B1 * | 9/2002 | Isermann | G01P 3/489 702/96 |
| 6,591,209 | B1 | 7/2003 | Romano et al. | |
| 7,339,343 | B2 * | 3/2008 | Laaksonheimo | B66B 1/30 318/700 |
| 2002/0124628 | A1 * | 9/2002 | Price | G01C 22/02 73/1.79 |
| 2015/0210212 | A1 | 7/2015 | Schwantner | |
| 2015/0375719 | A1 | 12/2015 | Zhang et al. | |
| 2020/0231167 | A1 * | 7/2020 | Zhang | B60W 40/112 |

FOREIGN PATENT DOCUMENTS

| | | |
|---|---|---|
| CN | 105073526 A | 11/2015 |
| CN | 106573623 A | 4/2017 |
| CN | 107010074 A | 8/2017 |
| DE | 37 22 441 A1 | 1/1988 |
| DE | 42 31 192 A1 | 4/1993 |
| DE | 196 54 769 A1 | 7/1998 |
| DE | 102 96 334 T5 | 4/2004 |
| DE | 103 43 070 A1 | 4/2005 |
| FR | 2 851 047 A1 | 8/2004 |
| GB | 2497087 A | 6/2013 |
| WO | WO-2008086850 A1 * | 7/2008 .......... B60W 40/105 |

OTHER PUBLICATIONS

German-language Written Opinion (PCT/ISA/237) issued in PCT Application No. PCT/EP2018/074528 dated Dec. 10, 2018 (five pages).

German-language Search Report issued in counterpart German Application No. 10 2017 217 804.3 dated Aug. 7, 2018 with partial English translation (13 pages).

Chinese-language Office Action issued in Chinese Application No. 201880046975.4 dated Aug. 10, 2022 with English translation (20 pages).

* cited by examiner

DEVICE AND METHOD FOR DETERMINING A TACHOMETER CHARACTERISTIC CURVE OF A VEHICLE, SYSTEM FOR CONTROLLING THE SPEED OF A VEHICLE AND VEHICLE

CROSS REFERENCE TO RELATED APPLICATIONS

This application is a continuation of PCT International Application No. PCT/EP2018/074528, filed Sep. 12, 2018, which claims priority under 35 U.S.C. § 119 from German Patent Application No. 10 2017 217 804.3, filed Oct. 6, 2017, the entire disclosures of which are herein expressly incorporated by reference.

BACKGROUND AND SUMMARY OF THE INVENTION

The embodiments of the present invention relate to a device and to a method for determining a tachometer characteristic curve of a vehicle, to a system for performing closed-loop control of the speed of a vehicle, and to a vehicle.

In contemporary motor vehicles, speed control takes place, for example within the scope of an adaptive cruise control (ACC) system, on the basis of a control error which is formed from a set speed predefined by the driver and the speed displayed on the tachometer (referred to as tachometer speed). The tachometer speed usually deviates from the actual physical speed of the vehicle and is therefore generally higher. It is obtained from a measured speed by means of a calculation rule which is stored in the tachometer software and which generally includes filtering and the application of a characteristic curve which is referred to as a tachometer characteristic curve.

Therefore, there is, in particular, no physically correct relationship between the tachometer speed and the acceleration as well as the distance travelled by the vehicle even if the measurement corresponds precisely to the physical speed. Furthermore, the underlying measurement frequently deviates from the physical speed, e.g. if the determination of the speed is based exclusively on the evaluation of wheel speed sensors, as a result of which variables such as the wheel diameter and the slip affect the determined speed. Fixed values, which can deviate from the real ones, are generally stored for these variables.

Advanced methods for controlling the speed supplement the actual controller with a preceding trajectory planning process which calculates a chronological setpoint profile for the desired target state in terms of acceleration, speed and location. The subsequent control process forms its control errors with respect to the setpoint variables. The planning of the trajectory requires, in particular, that the physically correct target speed is known. Since the setpoint speed which is predefined by the driver relates to the tachometer display, the set speed must be converted using the inverse characteristic curve which represents the steady-state relationship between the tachometer speed and the physical speed. To do this, the characteristic curve of the trajectory planning process must be known or be indicated by the tachometer software via an interface. Furthermore, if the tachometer speed is based on a speed which deviates from the physical speed, the characteristic curve which is necessary in the trajectory planning is thus not identical to the characteristic curve which is stored in the tachometer software. This then merely constitutes an approximation.

An object of the embodiments of the present invention is to specify a device and a method for determining a tachometer characteristic curve, a system for performing closed-loop control of the speed of a vehicle and a vehicle which permit all precise determination or closed-loop control of the speed of the vehicle.

This and other objects are achieved by means of the device for determining a tachometer characteristic curve of a vehicle, in particular of a motor vehicle, has: a detection apparatus which is configured to detect locomotion of the vehicle and convert it into corresponding locomotion signals, and a determining apparatus which is configured to derive speed values from the locomotion signals, which speed values characterize the speed of the vehicle, to determine a locomotion signal mean value from the locomotion signals which are obtained in at least one time window in which a fluctuation of the locomotion signals and/or of the speed values lies within a predefined fluctuation range, to determine a speed mean value from the speed values which have been derived from the locomotion signals obtained in the at least one time window, and to form a tachometer characteristic curve on the basis of one or more mean value pairs, which is/are formed by means in each case one locomotion signal mean value and one speed mean value, by means of which tachometer characteristic curve locomotion signals and speed values can be converted into one another, and/or to change a tachometer characteristic curve which is already present.

The method according to the invention for determining a tachometer characteristic curve of a vehicle, in particular of a motor vehicle, has the following steps: detecting locomotion of the vehicle and converting the detected locomotion into corresponding locomotion signals; deriving speed values, which characterize the speed of the vehicle, from the locomotion signals; determining a locomotion signal mean value from the locomotion signals obtained in at least one time window in which a fluctuation of the locomotion signals and/or of the speed values lies within a predefined fluctuation range; determining a speed mean value from the speed values which have been derived from the locomotion signals obtained in the at least one time window, and forming a tachometer characteristic curve which can convert locomotion signals and speed values into one another, and/or changing an already present tachometer curve on the basis of one or more mean value pairs which is/are formed by, in each case, one locomotion signal mean value and speed mean value.

The system according to the invention for performing closed-loop control of the speed of a vehicle has: a display device which is configured to display an actual speed value which characterizes the current speed of the vehicle, an input device which can predefine a setpoint speed value on the basis of the displayed actual speed value, the device according to the invention, wherein the determining apparatus is configured to determine a setpoint locomotion signal from the setpoint speed value on the basis of the formed or changed tachometer characteristic curve, and a closed-loop control apparatus which is configured to determine, on the basis of the setpoint locomotion signal and the locomotion signals generated by the detection apparatus, at least one manipulated variable for performing open-loop control of the vehicle.

The vehicle according to the invention, in particular a motor vehicle, has a system according to the invention.

The locomotion signals are preferably signals which are obtained during sensory detection of the locomotion of the vehicle, for example a rotation of the wheels and/or a relative movement of the vehicle with respect to the roadway, or signals, values or variables which are derived from the obtained signals. The locomotion signals are therefore based on a measurement of the location of the vehicle and therefore constitute a measure of the physical speed of the vehicle.

The speed values are preferably values which are derived, on the basis of a characteristic curve, in particular a tachometer characteristic curve, from the locomotion signals which are based on a measurement, and speed values are preferably specified in a unit of measurement which is customary for speeds, such as e.g. km/h. In addition to the application of a characteristic curve which represents a static relationship, in this context it is also possible for dynamic processing of the locomotion signals to take place, for example smoothing by means of filtering.

The embodiments of the present invention are based on the approach of being able forming and/or correcting a tachometer characteristic curve into learning processes which are carried out during travel, by means of which tachometer characteristic curve signals which are based on a measurement relating to the physical speed of the vehicle and the speed values which correspond to these signals can be converted into one another. A possibly already present tachometer characteristic curve is corrected here on the basis of locomotion signals acquired during travel by means of measurement and speed values which are derived therefrom. It is also possible to newly form a tachometer characteristic curve from the locomotion signals acquired during travel and the speed values which are derived therefrom. In the case of new formation, the characteristic curve is preferably initially supplied with data, i.e. the characteristic curve is predefined at the start of the start of the method and then corrected on the basis of locomotion signals acquired during travel by means of measurement and speed signals derived therefrom.

On the basis of the tachometer characteristic curve which is acquired in this way or the corresponding inverse tachometer characteristic curve is possible to convert locomotion signals and speed values correctly into one another with increased reliability. In particular, as a result a setpoint speed value (referred to as set speed) which is predefined by the driver for the purpose of automatic speed control and which relates to the speed displayed on the tachometer (referred to as the tachometer speed), or is based thereon, can be converted correctly with increased reliability into the corresponding setpoint locomotion signal (referred to as physical target speed) with which the respective currently measured locomotion signals are then compared, which increases the accuracy of the speed control or the correctness of the physical speed which is actually being traveled at. In particular, in the steady state this leads to improved correspondence of the setting speed and the displayed tachometer speed, which is particularly advantageous from the point of view of the driver.

The method requires as input variables, in particular, the current tachometer speed and a measurement of the current physical speed and preferably has two component steps. In this context, it is firstly decided whether a learning process is permissible at the current point in time by checking whether the vehicle is traveling at an essentially constant speed (referred to as constant travel detection). In the event of a positive result, the tachometer characteristic curve is correspondingly adapted and the corresponding point of the tachometer characteristic curve is set. For example, the tachometer characteristic curve can be predefined at the start of the method by means of plausibility assumptions and gradually changed or optimized during travel.

A learning process is preferably carried out only when travel is occurring at a constant speed (referred to as constant travel) so that the resulting approximated characteristic curve describes a steady-state relationship between the tachometer speed and the physical speed.

In order to detect constant travel it is preferably assessed to what extent the measurement of the physical speed varies in a given time window by checking e.g. whether the standard deviation undershoots a limiting value. If this is the case, the mean value of the physical speed and of the tachometer speed are determined in the time window under consideration (referred to as locomotion signal mean value or speed mean value). Alternatively or additionally, for the purpose of detection of constant travel it is assessed to what extent the tachometer speed which is derived from the measured physical speed varies in a given time window by checking e.g. whether the standard deviation of the tachometer speed undershoots a limiting value. If this is the case, the mean value of the tachometer speed and that of the physical speed are determined in the time window under consideration (speed mean value or locomotion mean value).

A tachometer characteristic curve which is already present is then preferably changed in such a way that its profile intersects the point which is given by the current mean values of the physical speed and of the tachometer speed (referred to a mean value pair). This can be done, for example, by incorporating a new data point into the existing characteristic curve or replacing an old data point. In this way, the respectively current valid approximation of the characteristic curve is obtained.

During the described determination of the, in particular inverse, tachometer characteristic curve there is advantageously no need for any knowledge about the characteristic curve of the tachometer control apparatus on the basis of which the tachometer speed which is respectively displayed on the tachometer is derived from the locomotion signals which are based on a measurement and, if appropriate, filtered.

In addition, the inverse tachometer characteristic curve can also be determined correctly or at least with a high level of correctness if the apparatuses for trajectory planning and/or speed control are provided with different locomotion signals than are fed into the tachometer. In this case, the correct characteristic curve which is necessary to obtain correspondence of the set speed and displayed tachometer speed in the steady state is determined. However, the determined characteristic curve does not have to correspond precisely to the inverse characteristic curve which is used in the tachometer.

Last but not least, the embodiments of the present invention also eliminate or at least reduce the susceptibility to errors when converting the physical speed into the displayed or set speed, and conversely in the case of single-sided changing of the characteristic curve in just one of the control apparatuses.

Overall, the embodiments of the present invention permit more precise determination or closed-loop control of the speed of the vehicle in a simple and reliable way.

The determining apparatus is preferably configured to derive the speed values from the locomotion signals on the basis of a predefined characteristic curve. For example, the characteristic curve is predefined by initial supply of data, i.e. the characteristic curve is predefined at the start of the method, e.g. on the basis of a plausible assumption of the relationship between the speed values and the locomotion signals. The predefined characteristic curve can, however, also correspond to a tachometer characteristic curve which is already present, and which has, if appropriate, already been changed once or repeatedly in the manner described above, for example a characteristic curve of the tachometer control apparatus, on the basis of which curve the tachometer speed which is respectively displayed on the tachometer is derived from the locomotion signals which are based on a measurement. The predefined characteristic curve on the basis of which the speed values are derived from the locomotion signals is preferably the respectively current tachometer characteristic curve, said characteristic curve which has been formed or changed in the inventive manner. The tachometer characteristic curve is therefore in this case determined by recursion and whenever the learning process is run through it permits more precise conversion of location signals into speed signals and vice versa.

The fluctuation in the locomotion signals is preferably the standard deviation of the locomotion signals, obtained in the at least one time window, from the associated locomotion signal mean value. The determining apparatus is configured here to calculate, from the locomotion signals obtained in the predefined time window, both the arithmetic mean and the standard deviation of the locomotion signals from the mean value. Alternatively or additionally, the fluctuation in the speed values is the standard deviation of the speed values which have been derived from the locomotion signals obtained in the at least one time window, from the associated speed mean value. The determining apparatus is configured here to calculate, from the speed values obtained in the predefined time window, both the arithmetic mean and the standard deviation of the speed values from the mean value. The standard deviation constitutes a simple and reliable possible way of detecting constant travel.

However, as an alternative to the standard deviation it is also possible to determine the fluctuation over time in the locomotion signals in the time window by means other methods, e.g. by counting how many locomotion signals undershoot or exceed specific limiting values which characterize the fluctuation range. The same applies to the speed values derived from the locomotion signals. If there number is below a predefined number, it is possible to infer constant travel, and the mean value pair which is determined for this time window from the locomotion signal mean value and speed mean value are inserted into the tachometer characteristic curve. This possible variant of constant travel detection is also simple and reliable.

The determining apparatus may be configured to determine locomotion signal mean values, speed mean values and/or standard deviations for the locomotion signal and speed values obtained in time windows of different duration. In particular, in this context the determining apparatus is configured to change the duration of the time window periodically between a minimum duration and a maximum duration. Predefining time windows with variable lengths permits, where appropriate, the learning process including the determination of locomotion signal mean values and speed mean values also to take place when constant travel occurs for a relatively short time. When using time windows of variable length, the storage requirement can be reduced by using recursive methods.

The determining apparatus is preferably configured to change the already present tachometer characteristic curve on the basis of one or more mean value pairs only when the mean value pair or pairs lies/lie within a predefined deviation from the tachometer characteristic curve which is present. The maximum permissible deviation can be predefined e.g. by means of an absolute or percentage value of the deviation with the respectively determined locomotion signal mean value and/or speed mean value from the corresponding point on the tachometer characteristic curve which is present. As a result, it is possible to avoid a change in the characteristic curve which exceeds a specific amount, for example in order to avoid a large change in the target speed.

The determining apparatus can preferably be configured to change the already present tachometer characteristic curve on the basis of one or more mean value pairs only when a predefined rate of change which characterizes the maximum number of permissible changes in the tachometer characteristic curve per unit of time, would not be exceeded by a change in the tachometer characteristic curve. In this way, it is additionally possible to take into account a rate limitation when adapting the characteristic curve, in order to avoid excessively rapid adaptation of the tachometer characteristic curve and consequently e.g. excessively rapid adaptation of the target speed.

Other objects, advantages and novel features of the present invention will become apparent from the following detailed description of one or more preferred embodiments when considered in conjunction with the accompanying drawings, in which:

DETAILED DESCRIPTION OF EMBODIMENTS

Figure 1:
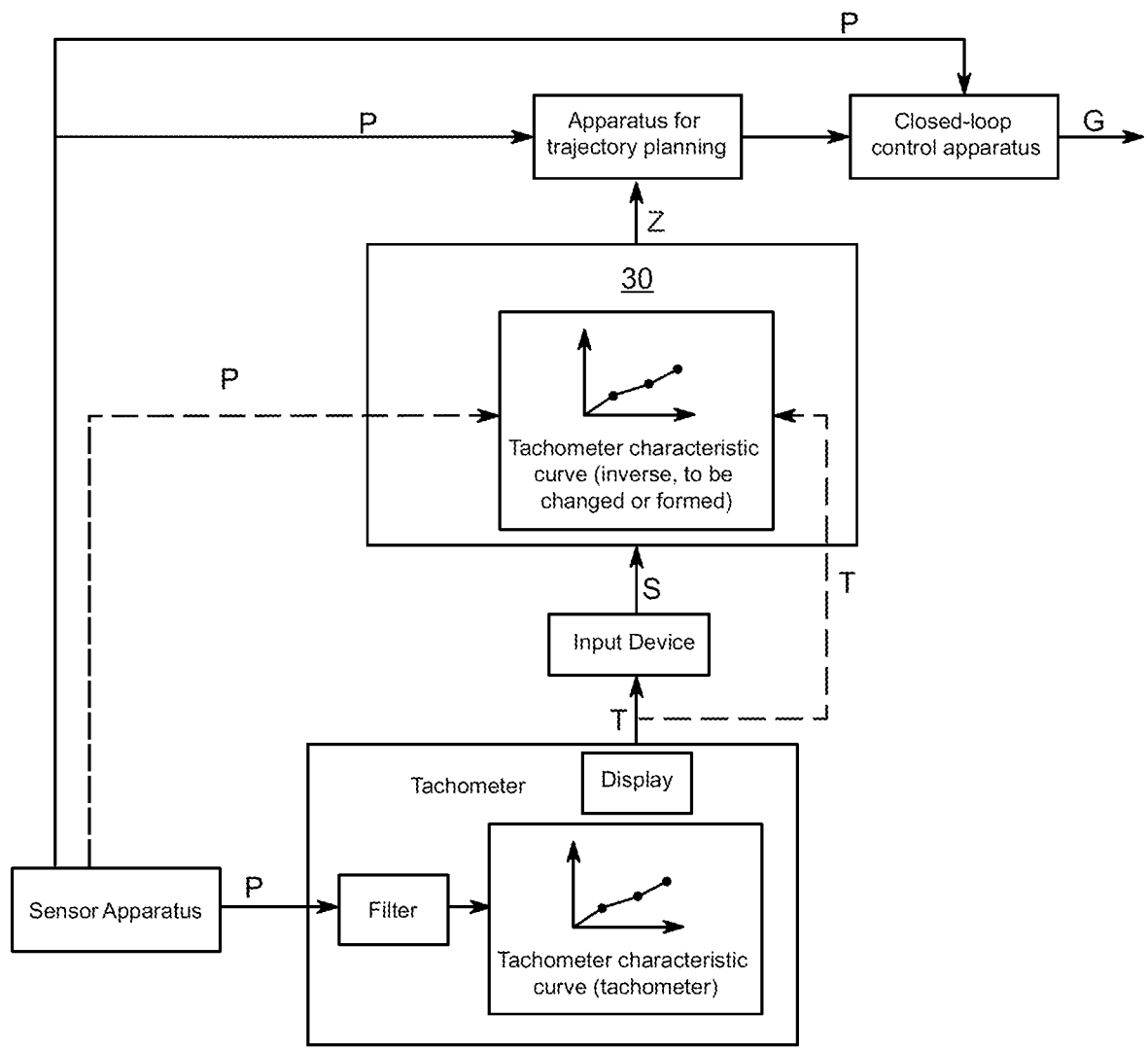
FIG. 1 shows a schematic design of a speed control system.

FIG. 1 shows an example of a schematic design of a speed control system. A sensor apparatus 10 which is provided on the vehicle is configured to detect by sensor the locomotion of the vehicle and convert it into corresponding locomotion signals P. The sensor apparatus 10 can be e.g. a rotation sensor for detecting the rotation of one or more wheels of the vehicle. The locomotion signals P which are based on a measurement constitute a measure of the physical speed of the vehicle, even if this measure could deviate from the actual speed of the vehicle.

The locomotion signals P are fed to a tachometer 20 in which they are firstly filtered in a filter 22 and then converted, by means of a predefined tachometer characteristic curve 21, into corresponding speed values T, which are also referred to as the tachometer speed. On the basis of the tachometer speed T displayed in a display 23 of the tachometer 20 the driver of the vehicle can predefine, at an input device 1, a setpoint speed value S which is also referred to as the set speed and which is fed to an apparatus 30 in which the set speed S is converted on the basis of an inverse tachometer characteristic curve 31 into what is referred to as a target speed Z which corresponds to a setpoint locomotion signal on the basis of which one or more manipulated variables G are determined in an apparatus for trajectory planning 40 and/or a downstream closed-loop control apparatus 50 by comparison with the currently detected locomotion signals P, on the basis of which manipulated variables G what is referred to as the longitudinal guidance of the vehicle, in particular acceleration, deceleration or maintaining of the speed, and/or lateral guidance, in particular an automatic steering activity for guiding the vehicle along the planned trajectory, are/is controlled.

The apparatus 30 is also configured to form and/or change the tachometer characteristic curve 31 within the scope of a learning process running during travel, so that said tachometer characteristic curve 31 represents as correctly as possible the relationship between the physical speed of the vehicle and the corresponding locomotion signals P, on the one hand, and the speed values T derived therefrom, on the other hand. For this purpose, the measured physical speed and the corresponding locomotion signals P and the tachometer speed derived therefrom and the corresponding speed values T are fed to the apparatus 30 (see dashed arrows). How the tachometer characteristic curve 31 is formed therefrom or changed will be explained in more detail below with reference to FIG. 2.

Figure 2:
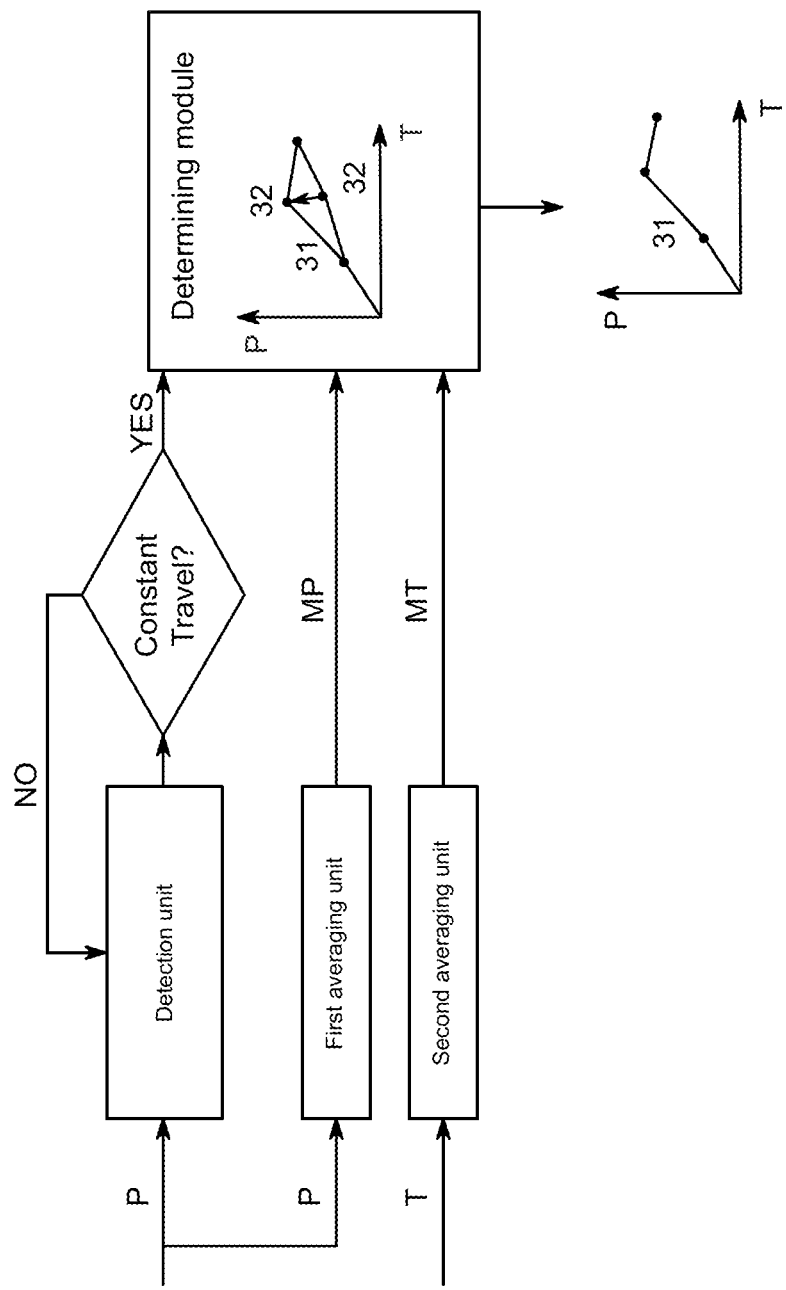
FIG. 2 shows an example of a diagram illustrating the determination of the tachometer characteristic curve.

FIG. 2 shows an example of a diagram illustrating the determination of the tachometer characteristic curve 31. In a first averaging unit 33, a locomotion signal mean value MP is calculated from the locomotion signals P obtained in a predefined time window, said locomotion signal mean value MP being calculated, for example, by forming the arithmetic mean value from the locomotion signals P. In a second averaging unit 34, a speed mean value MT is calculated from the speed values T derived, by means of the tachometer characteristic curve 21 (see FIG. 1), from the locomotion signals P obtained in the predefined time window, said speed mean value MT being calculated e.g. also by forming the arithmetic mean value.

The locomotion signal mean value MP and the speed mean value MT are fed as a value pair to a determining module and used there as a point of the tachometer characteristic curve 31 which is to be formed or as a new point 32 of the tachometer characteristic curve 31 which is to be changed, if constant travel has been detected for the time window under consideration. For this purpose, in a detection unit 35, variation of the location signals P and/or speed values T about the respectively calculated mean value is determined and it is estimated on the basis of the determined variation whether constant travel is occurring or not. For example, the standard deviation of the locomotion signals P and the speed values T from the locomotion signal mean value MP or speed mean value MT is calculated and determined with a predefined limiting value. If the standard deviation lies below the limiting value, constant travel is inferred. In this case, the corresponding, already present point 32' on the tachometer characteristic curve 31 is replaced in the determining module 36 by a new point 32 which is formed by the value pair composed of the locomotion signal mean value MP and the speed mean value MT. However, it is also possible for a new point to be inserted between two already present points of the tachometer characteristic curve 31. The already present tachometer characteristic curve 31 is therefore changed in such a way that its profile intersects the point which runs through the current mean values of the physical speed MP and the tachometer speed MT.

In this way, a changed tachometer characteristic curve 31 is obtained which can be changed further in a corresponding way in further learning processes during the current travel and/or further travel, in order to permit even more correct conversion of the physical speed into the tachometer speed, and vice versa. In particular, the conversion described in relation to FIG. 1, of a set speed S which is predefined by the driver into the corresponding physical target speed Z or the corresponding setpoint locomotion signal, takes place on the basis of the respective currently present approximation of the tachometer characteristic curve 31.

In order to reduce the memory requirement, the calculation of the variation, in particular of the standard deviation, and of the mean values MP and MT can be advantageously carried out with recursive methods by using a time window of a variable length, which time window preferably increases from a minimum length to a maximum length at periodic intervals.

If a change in the characteristic curve 31 which exceeds a certain amount is to be avoided, in order e.g. to avoid an excessively large and/or excessively fast change in the target speed, during the adaptation of the characteristic curve 31 it is additionally possible to take into account a limitation of the extent and/or of the rate over time of the adaptation. This can be done e.g. by predefining a maximum permissible deviation of a new data point from an already present point or profile and/or a maximum permissible rate of change which characterizes the maximum number of permissible changes in the tachometer characteristic curve per unit of time.

LIST OF REFERENCE SYMBOLS

1 Input device
10 Sensor apparatus
20 Tachometer
21 Tachometer characteristic curve (tachometer)
22 Filter
23 Display
30 Apparatus
31 Tachometer characteristic curve (inverse, to be changed or formed)
32 New point on tachometer characteristic curve
32' Old point on tachometer characteristic curve
33 First averaging unit
34 Second averaging unit
35 Detection unit
36 Determining module
40 Apparatus for trajectory planning
50 Closed-loop control apparatus
G Manipulated variable/variables
MP Locomotion signal mean value/mean value of physical speed
MT Speed mean value/mean value of tachometer speed
P Locomotion signal/physical speed
S Setpoint speed value/set speed
T Speed value/tachometer speed
Setpoint locomotion signal/target speed The foregoing disclosure has been set forth merely to illustrate the embodiments of the present invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a tachometer characteristic curve of a motor vehicle, the method comprising the acts of:
   detecting locomotion of the vehicle and converting the detected locomotion into corresponding locomotion signals;
   deriving speed values, which characterize the speed of the vehicle, from the locomotion signals;
   determining a locomotion signal mean value from the locomotion signals obtained in at least one time window in which a fluctuation of the locomotion signals and/or of the speed values lies within a predefined fluctuation range;

determining a speed mean value from the speed values which have been derived from the locomotion signals obtained in the at least one time window; and forming a tachometer characteristic curve which converts locomotion signals and speed values into one another, and changing an already present tachometer curve on the basis of one or more mean value pairs which are formed by one locomotion signal mean value and speed mean value, wherein the first iteration of the method uses a predefined characteristic curve as the already present tachometer curve.

2. A device for determining a tachometer characteristic curve of a motor vehicle, comprising:

a detection apparatus which is configured to detect locomotion of the motor vehicle and convert it into corresponding locomotion signals; and a determining apparatus which is configured to derive speed values from the locomotion signals on the basis of a predefined fluctuation range at the start of a recursive method, to derive speed values from the locomotion signals, which speed values characterize the speed of the vehicle, to determine a locomotion signal mean value from the locomotion signals which are obtained in at least one time window in which a fluctuation of the locomotion signals and/or of the speed values lies within a predefined fluctuation range, to determine a speed mean value from the speed values which have been derived from the locomotion signals obtained in the at least one time window, and to form a tachometer characteristic curve on the basis of one or more mean value pairs, which are formed by means of one locomotion signal mean value and one speed mean value, by means of which tachometer characteristic curve locomotion signals and speed values are converted into one another, and to change a tachometer characteristic curve which is already present.

3. The device according to claim 2, wherein the fluctuation of the locomotion signals is the standard deviation of the locomotion signals, obtained in the at least one time window, from the associated locomotion signal mean value.

4. The device according to claim 3, wherein the locomotion signal mean values have at least one time window and/or the standard deviations for the locomotion signals have at least one time window, the determining apparatus is configured to determine the locomotion signal mean values and/or standard deviations for the locomotion signals obtained in the at least one-time window, and the time windows have different durations if the number of time windows is greater than one.

5. The device according to claim 4, wherein the determining apparatus is configured to change the duration of the time windows of different duration periodically between a minimum duration and a maximum duration.

6. The device according to claim 5, wherein the determining apparatus is configured to change the already present tachometer characteristic curve on the basis of one or more mean value pairs only when the mean value pairs lie within a predefined deviation from the tachometer characteristic curve which is present.

7. The device according to claim 5, wherein the determining apparatus is configured to change the already present tachometer characteristic curve on the basis of one or more mean value pairs only when a predefined rate of change which characterizes the maximum number of permissible changes in the tachometer characteristic curve per unit of time is not exceeded by a change in the tachometer characteristic curve.

8. A system for performing closed loop control of the speed of a vehicle, comprising:

a display device which is configured to display an actual speed value which characterizes the current speed of the vehicle;

an input device which predefines a setpoint speed value on the basis of the displayed actual speed value;

a device according to claim 7, wherein the determining apparatus is configured to determine a setpoint locomotion signal from the setpoint speed value on the basis of the formed or changed tachometer characteristic curve, and a closed loop control apparatus which is configured to determine, on the basis of the setpoint locomotion signal and the locomotion signals generated by the detection apparatus, at least one manipulated variable for performing open loop control of the vehicle.

9. A motor vehicle having a system according to claim 8.

* * * * *